US006071444A

United States Patent [19]

Worrell, Jr. et al.

[11] Patent Number: 6,071,444

[45] Date of Patent: Jun. 6, 2000

[54] PROCESS FOR MANUFACTURE OF PERFORATED SLAB PROPELLANT

[75] Inventors: William J. Worrell, Jr., Draper; David A. Worrell, II, Radford; Joseph M. Donckers, Blacksburg, all of Va.

[73] Assignee: Alliant Techsystems Inc., Hopkins, Minn.

[21] Appl. No.: 08/979,447

[22] Filed: Nov. 24, 1997

[51] Int. Cl.[7] ...................................................... B29C 67/00

[52] U.S. Cl. ................................ 264/3.1; 264/156; 86/1.1

[58] Field of Search ............................ 264/3.1, 122, 109, 264/154, 156, 3.2, 3.3; 86/1.1

[56] References Cited

U.S. PATENT DOCUMENTS 5,403,035 4/1995 Hamilton ................................ 280/736

5,712,445 1/1998 Kassuelke et al. .

*Primary Examiner*—Jan H. Silbaugh

*Assistant Examiner*—Kenneth M. Jones

*Attorney, Agent, or Firm*—Nikolai, Mersereau & Dietz, P.A.

[57] ABSTRACT

A method of producing a perforation pattern in a slab of thermoplastic propellant material and the material produced includes subjecting the slab to a perforating press operation in which the press has a patterned array of fixed perforating members arranged according to a first pattern coordinated with a system for advancing and incrementally indexing the slab through the press is used to perforate the slab to create a desired second, denser perforation pattern by subjecting the slab to a series of perforation actions by the patterned array of perforating means coordinated with the indexing of the slab through the press.

12 Claims, 3 Drawing Sheets

PROCESS FOR MANUFACTURE OF PERFORATED SLAB PROPELLANT

BACKGROUND OF THE INVENTION

I. Field of the Invention

The present invention is directed generally to the field of sophisticated, high velocity, large or medium caliber projectile ammunition and, more particularly, improvements in the manufacture of segmented slab or disk material for use in a propellant system in the form of an ordered series of shaped slabs or disks. The use of such shapes leads to a more efficient use of propellant load space, reduces loading labor and overall cost, yet uses highly accurate propellant geometry to produce better, more uniform burning progressivity and increase propellant load leading to improved repeatability and more reliable and improved ballistic performance. Highly perforated propellant segments can be employed in the load to controllably increase burn rate and thereby increase overall propellant energy production efficiency.

II. Related Art

The evolution of large and medium caliber ordnance predictably has led to the development of increasingly sophisticated projectile rounds and firing systems. The use of smaller diameter projectiles together with discarding sabots to transfer momentum and velocity to the projectiles has led to the development of very high velocity (Mach V+) and highly accurate munitions. These sophisticated munitions also may contain highly sensitive target proximity detection devices which operate precision arming and detonating circuits. This allows the warhead to be detonated at or close to the most proximate approach to the target. In addition to the electric control and sensing improvements, the construction of the rounds themselves has undergone an evolution that has produced vastly improved capabilities in terms of the lethality produced by a single round on a target.

Conventional ammunition of the class described, such as that fired by military tank cannons, are typically breech loaded, electrically activated and fired from within the tank. The projectiles typically are electrically fired using a primer circuit which ignites a primer which, in turn, ignites a main propellant charge using DC voltage from a thermal battery. The projectile may contain electronics which utilize memory storage to operate a preprogrammed target acquisition or proximity system, and the arming and detonating devices in the shell during the flight of the shell. Then, it is apparent that large caliber ammunition, with respect to target acquisition, proximity detection, arming and detonating, has become very sophisticated. In addition, the projectiles themselves have become more aerodynamic and capable of traveling at speeds above Mach V.

While all these developments are interesting and important in the advancement of the art, the success of all ammunition projectiles still depends greatly upon the performance and the reproducibility of the performance of the associated propellant system.

Mass rate of gas generation is controlled by either physical or chemical means. While the development of new energetic formulations is on-going, many of these have problems meeting military specifications including insensitive munitions criteria. A variety of techniques have been tried in order to improve ammunition muzzle velocity performance by increasing propellant charge density, i.e., increasing the amount of propellant per available cartridge volume unit. These techniques have included utilizing various preformed shapes packed into the cartridge in an effort to increase density while minimizing adverse effects on burning rate. Such techniques have included the use of various sizes of granular extruded (short grain) propellant shapes, perforated stick extruded shapes which are long and cylindrically shaped and represent the most commonly used shapes. Another configuration is in the form of a rolled sheet of propellant. Bulk liquid propellants have also been used; however, they tend to burn in a non-reproducible manner and, therefore, results have been unpredictable.

In addition to the granular extruded (short grain) prior configuration, compressed granular solid and perforated extruded shapes have been used. While the extruded stick shape has increased projectile velocities, each stick has to be notched or "kerf cut" in several places on the side to prevent overpressurization during the burn. Stick and granular propellants are processed with 1, 7, 19 and 37 perforations (perf) to enhance progressivity. The 120 mm tank ammunition, for example, has evolved from 7-perf to 19-perf partial-cut (PC) stick and the stick propellant has also presented difficulties with respect to achieving high loading density. These factors make stick propellant more labor intensive than desired and difficult and costly to load in production.

With respect to processing, the propellant manufacturer making stick propellant must begin with carpet rolled propellant, extrude it with perforations, cut it to length, blend each length to minimize lot to lot performance variation, and kerf cut each length of stick before the propellant may be used.

The loading process for a cartridge using stick propellant is also very labor intensive and performance is not optimum because of problems mating surfaces of the sticks, as in the case of random placement with granular propellant. The method used to extrude both stick and granular propellant creates perforations during the process. However, dimensional variability is inherent in the extrusion process relative to the final web size and this reduces the propellant performance.

Repeatability of acceptable or good performance of stick propellant also requires uniformity of the notch or kerf size and web between the kerfs for proper burning. The current processes of extrusion and kerf cutting are rarely able to achieve this so that the sticks must be blended or mixed prior to loading to achieve some uniformity. The stick propellant, however, does give better performance than 19-perf granular propellant.

Another method utilizing ribbed sheet propellant rolled into cylindrical sections has been tested on smaller caliber ammunition. This method used longitudinal ribs replacing perforations to assist ignition. The rolled method experienced difficulty in conformance to the projectile geometry, poor progressivity, poor flame spread and poor ignition characteristics.

The provision of propellant segments in the form of disk or slab propellant shapes yields more efficient use of propellant load space and can achieve improved highly progressive burning and improved ballistic performance.

The slab loading can be parallel or perpendicular to the longitudinal axis of the munition, depending on the technique used. Typically, the disk load includes a plurality of ordered, serially stacked, relatively flat sided disk-shaped segments arranged perpendicular to the longitudinal axis of the cartridge or shell casing, each disk member having a large number of relatively small diameter perforations arranged in a predetermined pattern in accordance with aiding burn progression. The outside periphery of each disk is designed to conform to the inside diameter geometry of the shell casing. A central opening is provided in each disk to accommodate the primer tube, if used, or to match the outer configuration of the projectile in the upper portion of the cartridge.

Aligned openings may be provided in the disks in the form of cutouts to accommodate one or more alignment rods, which may be ignition sticks. If desired, propellant spacers in the form of thin propellant rings may be interleaved between disks to adjust burn progressivity or performance.

With respect to the slabs, a plurality of stacked, substantially rectangular, longitudinally dispersed flat shapes or slabs are employed parallel to the longitudinal axis of the cartridge casing. These are also suitably shaped internally and externally and perforated and provided with interslab openings as required to produce the desired burn performance. The segments of propellant may vary in thickness from about 0.15 centimeters to about 2.54 centimeters as ballistics and propellant progressivity requires. More details regarding slab and disk propellant arrangements can be found in co-pending application Ser. No. 08/537,882 U.S. Pat. No. 5,712,445, Issued Jan. 27, 1998) to Kassuelke et al, filed Apr. 10, 1996 and assigned to the same assignee as the present application. The entire contents of that patent are hereby incorporated by reference herein for any purpose.

It has been found that if the segments are provided with a relatively dense pattern of small bore perforations that are perpendicular to the faces of the slabs, this ensures that the individual slab burns in a highly progressive manner. The perforated slab arrangement does increase propellant progressivity and correspondingly increases the velocity of a 120 mm tank round by more than five percent (5%) over a conventional 19-perf PC stick propellant round. In this highly developed art, this is a significant advantage.

However, while the performance of the perforated slab system offers significant superiority over the stick or granular propellant, no practical method of commercially feasible manufacture has been successfully developed. And, accordingly, such would fulfill a definite need in the art.

Accordingly, a primary object of the present invention is to provide an improved process for producing punched (perforated) disk or slab propellant.

Another object of the invention is to provide a practical means for automating the production of punched disk or slab propellant.

A still further object of the invention is to provide a punching or perforating step which uses a special punch die assembly and automated indexing to provide a desired dense regular perforation pattern in slab or disk propellant.

Yet another object of the invention is to provide a method of making a propellant which produces a highly accurate, repeatable geometry, thereby increasing load density and reducing loading time.

A yet still further object of the present invention to produce a propellant which results in an increased charge load with a highly repeatable high burning rate achieved at a lower production cost.

Yet still another object of the invention is to provide slab or disk propellant having a sophisticated, repeatable perf pattern that enhances the burning performance of the material and the performance of an associated round.

Other objects and advantages will appear to those skilled in the art in connection with increased familiarity with the description and accounts, together with the drawing figures contained in the specification.

SUMMARY OF THE INVENTION

The process of the invention preferably involves slabs of solventless propellants which can be extruded into large ribbons typically ½ to 1 inch (1.2–2.54 cm) thick times 6 inch (15.2 cm) wide times up to about 8 feet (244 cm) in length for the perforation process. At room temperature, the material is plastic in nature and can be bent with difficulty, but is not brittle. To facilitate punching, however, the material is processed at a slightly elevated temperature, generally in the range from about 140–150° F. to make the material as soft as possible to process keeping in mind the temperature range in which the particular material can be safely processed.

After temperature conditioning, the slabs are fed into a punch press device that includes a special punch die assembly which includes an upper die carrying an array of replaceable punching pins or punch members which operate through an intermediate stripper plate to an opening in a lower die assembly. The slabs to be perforated or punched as they are indexed along the press assembly by an advancing mechanism which operates to index slab in conjunction with the punching mechanism to create a precise pattern along the slab. A pattern of equilateral triangles or diamond shapes can be utilized and the size and spacing of the pins are such that requires four punch cycles for creation of the full equilateral triangle pattern and two cycles for the diamond shape.

The size and spacing of the punching members utilized is generally from about 0.025 to 0.05 inches (0.635 mm to 1.27 mm), preferably 0.03 to 0.04 inches (0.762–1.016 mm) with a pin spacing typically 0.1 to 0.15 inches (2.54–3.88 mm) in the perforated pattern. The pin spacing in the upper die of the punching device can be any desired pattern, but preferably consists of four rows of pins divided into two sections of two rows, each having an inter-pin spacing twice that of the desired pattern, the two-row sections being further separated by a distance equal to three-row spacings in the pattern. Thus, the slab is advanced or indexed a distance equal to twice the row spacing for each punch thereby completing a pattern of the required perforation density in two or four operations depending on whether a diamond or triangular pattern is desired. This enables the use of fewer pins and greater spacing in the die without sacrificing the number of perforations in the slab.

Preferably, the punch members are very sharp hardened steel and approximately a 15° point has been found to be the best for punching through the propellant material. The stripper plate cooperates with coil springs to smoothly retract the pins once the perforations are made and the stripper plate also helps to guide the pins as they are quite slender with respect to their length and this reduces pin breakage.

The punching mechanism is coordinated as by a mechanical flywheel or other such prime mover to operate the press, but a hand crank can also be used. The flywheel or cranking system can be mechanically linked, as by cams on the flywheel follower, to followers that operate an air solenoid used to index the work piece forward between punch cycles in a well-known manner.

The preferred materials to be processed are solventless propellants and examples of which include standard JA-2 propellant, RPD-350 and RPD-22 (all products of Radford Army Ammunition Plant). These are generally double-base solventless propellants. Solvent-type propellants are typically more brittle and therefore, more difficult to perforate, but it is believed that a number of these would also have the requisite physical properties to work in the process. To be processed, the material must be soft enough and sufficiently pliable to allow the pins to readily penetrate through the material to form discrete perforations at a temperature below that of heat sensitivity. Thus, any propellant material capable of meeting the process criteria and which would be used in a manner benefited by the process could be used in the process.

It will be appreciated that by means of the techniques of the present invention, a pattern of very closely spaced, small openings can be provided through relatively thick slab material using an alternating punching system in which the pins themselves are spaced further apart and less stress is put on the slab being perforated in any one punching stroke. This is an improvement both from the standpoint of the amount of energy required to operate the press, the number of punch members which are required to be mounted in the press and the energy required for the relative displacement of the material in the slab as it is processed.

BRIEF DESCRIPTION OF THE DRAWINGS

In the drawings wherein like numerals are utilized to designate like parts throughout the same.

DETAILED DESCRIPTION

Figure 1:
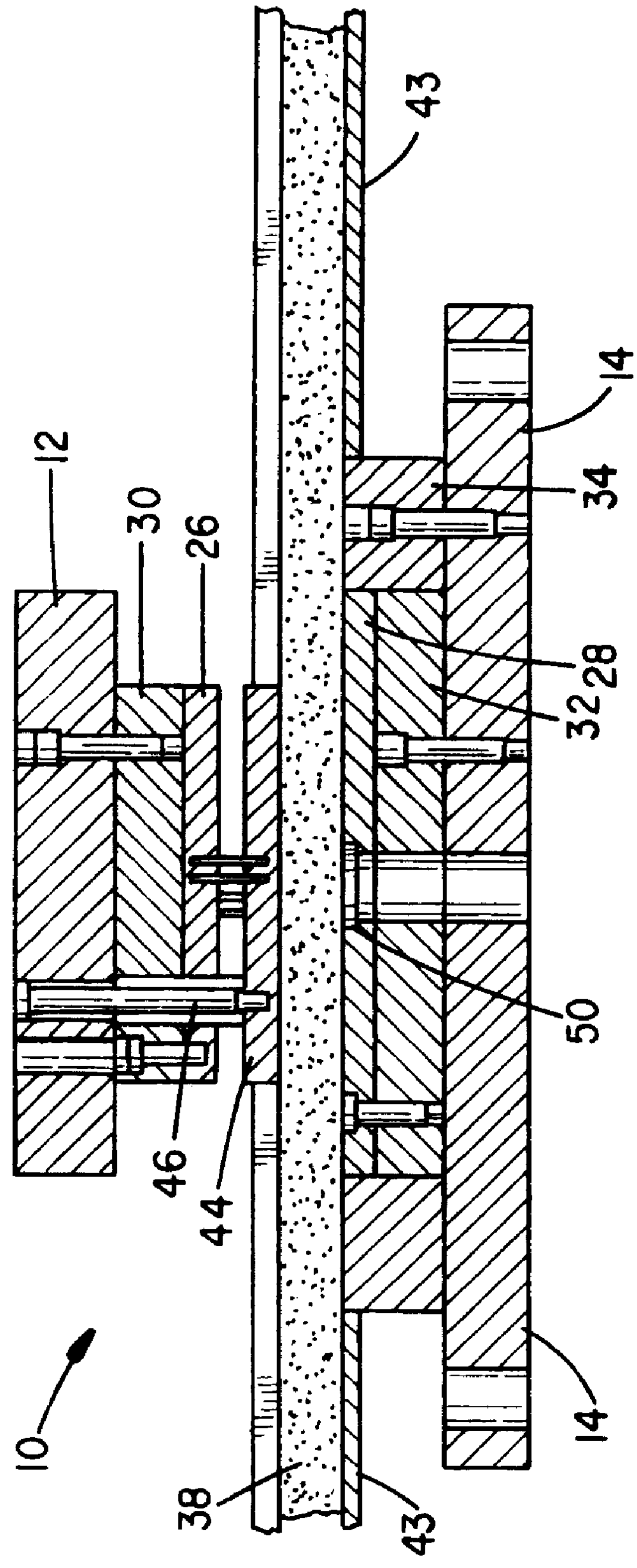
FIG. 1 depicts a side elevational cross-sectional view through a propellant punching press of the type used in the process of the invention with parts broken away and the press shown in the closed or punching position including the slab being processed.

The process of the present invention facilitates the production of slab propellant segments having a relatively high perforation pattern density not previously attainable commercially in a practical process. While the example materials processed are solventless propellants, it is noteworthy that any propellant or any thermoplastic material capable of being processed into slabs and safely undergoing the perforation process while remaining intact can be used. Processing temperature, width, thickness and perforation density will vary according to the material and application. Some solvent-type propellants undoubtedly could be processed in the same manner provided that they are sufficiently thermoplastic to allow punching. It remains particularly suitable, however, for the processing of typical solventless propellants, including single, double-based and triple-based propellants, including JA-2, RPD-350 and RPD-22 (nitramine containing).

The feedstock or material processed is fully blended and processed propellant material in elongated slab form extruded to size or otherwise cut to size. Typical pre-cut extruded segments for 120 mm rounds are 6 inches (152.4 mm) wide times 88 inches (223.5 cm) long times 0.25–1.0 inches (6.35–25.4 mm) thick, but any size can be processed with corresponding appropriately sized press dies inserted. Attempts to create a dense perforation pattern in these materials, particularly in thicker slabs, have not been previously successful. It will be appreciated that the amount of material laterally displaced by the punching operation is significant in relation to the inter-perforation space available requiring a great deal of energy to accomplish perforation and withdrawal. It is also very difficult to maintain the integrity of the punch members or pins in a very dense array and there is little tolerance for any misalignment. The perforation members are extremely thin usually (0.03–0.04 inches or 0.762–1.016 mm in diameter) compared to their length (up to about 2 inches, 5.1 cm), for example, and, if hardened to prevent bending, become extremely brittle and subject to breakage. These punch members would have to be spaced as little as 0.06 inches (1.521 mm) apart in a full pattern.

Figure 2:
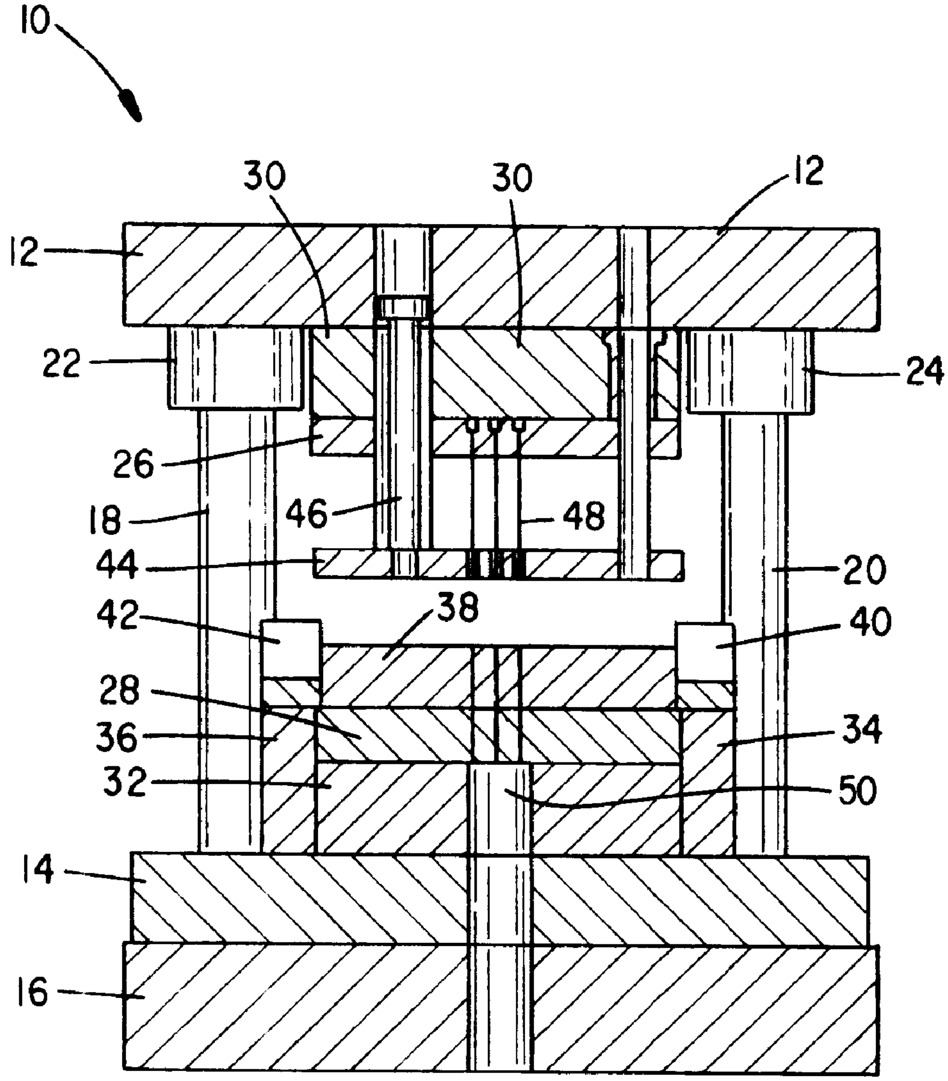
FIG. 2 represents an enlarged cross-sectional view through the propellant piercing press of FIG. 1 with the press in the open or retracted position.

The process of the invention allows slabs to be provided with perforation patterns as dense as needed while avoiding the mechanical pitfalls of the associated high punch member density by providing the desired pattern in a plurality of punching steps using a more open punch member population in cooperation with a slab indexing system which incrementally advances the slab between punching operations according to the desired pattern. FIGS. 1 and 2 illustrate a mechanical press, generally 10, suitable for practicing the perforation operation of the invention. The press includes a die set having spaced heavy parallel metal upper and lower plates 12 and 14, the lower plate 14 being mounted on a bolster plate 16. The upper and lower plates 12 and 14 are based and held in vertically adjustable alignment by four heavy steel rods or posts, two of which are shown at 18 and 20 in FIG. 2. Upper bushings are provided as at 22 and 24. The upper plate moves relative to the lower plate during a punching operation.

The press further includes upper die or punch member holder 26 and lower die 28 mounted on and flanked by die set or spacer plates 30 and 32, respectively. The lower die system is further flanked by front and rear risers 34 and 36. A slab in process is denoted 38 and it is further guided by front and rear rails 40 and 42 and is carried on supports 43 extending beyond the press proper. A stripper bar 44 carried by a plurality of stripper bolts, one of which is shown at 46, is mounted parallel to the punch member holder 26 and die 28 and is vertically adjustable relative to the punch member holder 26. An array of punch members 48 are removably mounted and punch holder 26 which is correspondingly aligned with the stripper plate 44 which has a congruent pattern of holes to accommodate the punch member such that the punch members operate through and in conjunction with the stripper plate. The stripper plate strips or cleans the punch members as they are retracted and also maintains the alignment of the punch members during perforation. The lower die 28 is provided with a recess at 50 in the form of a slot so that any punch pins misaligned by the pending operation are not damaged and so that the material moved by the punching operation falls into the trough and can be reprocessed.

Figure 3:
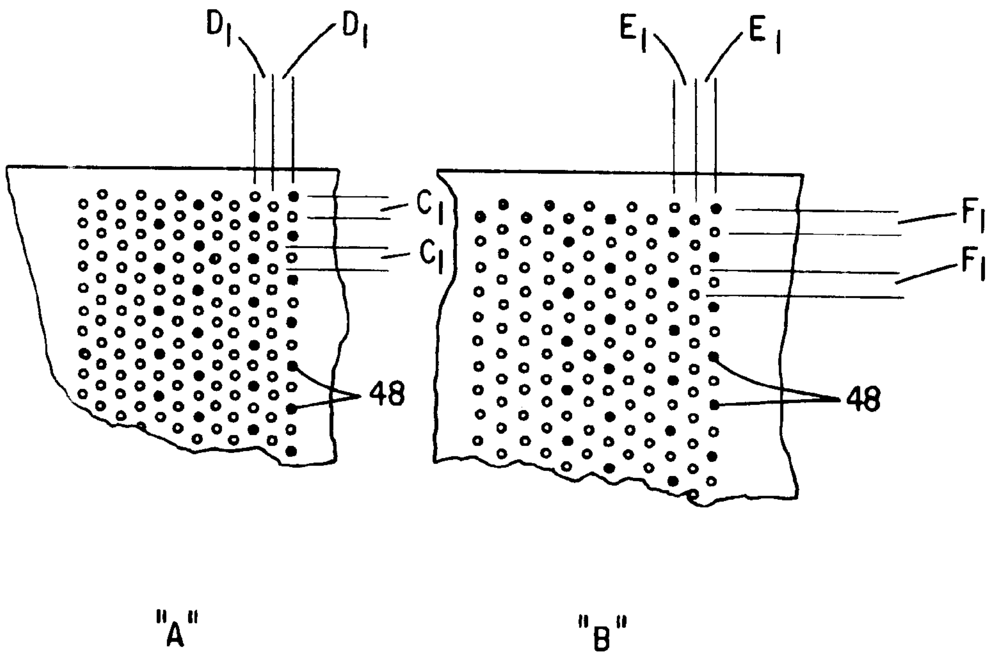
FIG. 3 depicts two typical perforation patterns for two different slab thicknesses with the punch member pattern superimposed over the perforation pattern as solid dots.

FIG. 3 illustrates two patterns of punch members superimposed on slab perforation patterns. The punch members themselves are arranged in a pattern that includes two pairs of spaced staggered rows that can be used to produce either diamond or equilateral triangle patterns. Punch members are illustrated as the solid dots in FIG. 3. From that illustration, it can be seen that the pattern density of the punch members is far lower than that of the full perforation pattern and that a full triangle pattern is accomplished by indexing the slab four times at a progression distance equal to two perforation pattern rows. The pairs of pins occupy every other desired perforation opening in each row and every other row per pair. The sets of pairs of punching members are separated by a distance of three perforation pattern rows as illustrated. The staggering of the pattern of adjacent punch member rows automatically fills in the denser pattern with the progression of the punching system. This configuration concept reduces the energy required for any punching operation because relatively fewer punch members must be caused to penetrate the slab at one time. Also, the punching operation itself is made much easier because the inter-punch member and thus, the inter-perforation distance is increased greatly by the alternate row, alternate hole configuration. In the punching operation, each punch member 48 penetrates the plastic-like propellant slab. It will be appreciated that most of the material displaced is pushed radially by the punch member. This, of course, is opposed by material being displaced by adjacent punch members in the array. The denser the array, the more difficult the punch operation and also the retraction of the punch members. It should be kept in mind that the punch members are relatively narrow compared to their length and thus readily distorted or broken. In this regard, the open pattern further reduces the maintenance on the device due to the need for replacing broken pins inasmuch as the entire pattern requires only about 100 pins.

The full pattern with pin position superimposed is shown in the "A" series of FIG. 3 produces a pattern of 0.04 inch openings, the "A" series being somewhat more dense ($D_1$= 0.0996 inch or 2.53 mm and $C_1$=0.115 inch or 2.92 mm) than that "B" series ($E_1$=0.1169 inch or 3.43 mm and $F_1$=0.135 inch or 3.43 mm). This translates into a 0.0750 web (1.905 mm) for the "A" pattern versus 0.0950 web 2.413 mm) for a 0.0400 inch pin or punch members (1.016 mm).

The progression of the indexing system is equal to the two-row distance or the distance between the rows in each pair of punch members in the four-row set. Indexing of the slab in conjunction with the punching operation is accomplished in a well-known manner. One such press uses a pneumatic indexing system that operates at about two operations per second. Indexing is coordinated with a mechanical flywheel driven system in which the flywheel is mechanically linked to the press cycle. Linkage including cams on the flywheel follower operate air solenoids to index the piece one progression at a time. Coil springs, not shown, are used to assist in retracting the pins through the stripper plate which cleans the pins as they are retracted and also maintains alignment during perforation. In this manner, an 88 inch (233.5 cm) slab can be processed typically in three minutes or less.

An important aspect of the perforation process of the invention is in the conditioning of the slabs prior to introduction to the press and perforation. The propellant material may be any stable-type material that is sufficiently plastic to be processed (not too brittle to be successfully punched). The slab feed for the perforation or punching process consists of links of feedstock of a width and length that can be accommodated by the particular press device used. These are typically about 6 inches wide, 88 inches long and up to 1 inch thick (15.2 cm by 233.5 cm by 2.54 cm) for 120 mm tank rounds, for example. After perforation, the slabs are cut to length and further shaped for loading into a round in a well-known manner. Typically shaping or cutting can be accomplished as by utilizing high pressure water or other means incapable of generating a spark.

The temperature of the slabs during the perforation operation is also an important aspect of the success of the process. For most double-based solventless propellants such as RPD-350, JA-2 and RPD-22, a processing temperature in the range of about 140° F. to 150° F. (60° C. to 65° C.) is preferred. This is because it has been found to be advantageous to perforate the material in as soft a state as possible, keeping in mind safe processing temperature limits of the particular material, i.e., keeping it below a temperature at which it may become unstable. It has also been found, in conjunction with the present invention, that processing the material at elevated temperature also reduces the relaxation of the material after the punch members have been withdrawn which leads to a more successful maintenance of the desired perforation pattern in the finished product.

In conjunction with the open pattern of the punch members in accordance with the invention, it should be noted that because it takes four punching operations to complete a triangle pattern and two punching operations for a diamond pattern, that initial and terminal four rows for a given slab will be incomplete. Allowance is made for this in the process so that the beginning and end sections not completely perforated can be lopped off and reprocessed along with the material removed in the punching operation.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

For example, whereas the apparatus and process have been described in relation to processing single, double or triple base propellant materials, examples of which have been given, these are intended to be exemplary rather than limiting with respect to the scope of the invention. Thus, any thermoplastic elastomer with the requisite thermoplastic physical properties can be processed, the key being that the material is soft enough and safe enough at a reasonable processing temperature.

What is claimed is:

1. A method of producing a perforation pattern in a slab of thermoplastic propellant material comprising steps of:

(a) providing a dimensioned slab of thermoplastic propellant material to be perforated;

(b) providing a perforating press having a base for receiving and carrying a slab of material to be perforated, said press having a patterned array of perforating members fixed therein and arranged according to a first perforation pattern, said first perforation pattern having a first perforation density and means for advancing and incrementally indexing said slab through the press;

(c) heating and temperature conditioning said slab to a desired processing plasticity prior to perforation;

(d) transferring said heated slab to said press;

(e) perforating said slab to create a desired second perforation pattern in said slab by subjecting said slab to a series of perforation actions by said patterned array of perforating members arranged according to said first perforation pattern coordinated with the indexing of said slab through said press;

(f) wherein said first perforating pattern of perforating means has a pattern density less than the density of said second perforation pattern and wherein the creation of the perforation pattern requires a plurality of sequential perforation steps; and (g) trimming and shaping said slab to the desired dimension segments for loading into a round.

2. The method of claim 1 wherein said slab comprises solventless propellant material.

3. The method of claim 2 wherein the slab is temperature conditioned at a temperature at which it is softened yet thermally safe.

4. The method of claim 3 wherein said temperature range is between about 140° F. to 150° F. (60° C. and 65° C.).

5. The method of claim 1 wherein said pairs of rows are separated by a distance equal to three rows of the second pattern.

6. The method of claim 5 wherein the indexing progression is equal to the inter-row distance in each pair of rows in the first pattern.

7. The method of claim 1 wherein the punching members have a diameter in the range of 0.03 to 0.04 inches and wherein the second pattern has a web distance between perforations from about 0.06 to about 0.1 inch.

8. The method of claim 1 further provides the step of operating said patterned array of perforating means through a stripper plate having a congruent pattern of openings.

9. The method of claim 1 wherein said first perforation pattern includes spaced pairs of rows of spaced punching members, the members in each pair of rows being arranged in a staggered pattern, said first perforation pattern having twice the member and row separation of said second perforation pattern.

10. The method of claim 9 wherein said pairs of rows in said first perforation pattern are separated by a distance equal to three rows of the said second perforation pattern.

11. The method of claim 10 wherein the increments of said incremental indexing is equal to the inter-row distance in each pair of rows in said first perforation pattern.

12. The method of claim 9 wherein the punching members have a diameter in the range of 0.03 to 0.04 inches and wherein the second perforation pattern has a web distance between perforations from about 0.06 to about 0.1 inch.

* * * * *